(12) United States Patent
Kurata et al.

(10) Patent No.: US 7,167,653 B2
(45) Date of Patent: Jan. 23, 2007

(54) OPTICAL TRANSCEIVER

(75) Inventors: Kazuhiko Kurata, Tokyo (JP);
Nobuharu Kami, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 10/026,695

(22) Filed: Dec. 27, 2001

(65) Prior Publication Data
US 2002/0085254 A1 Jul. 4, 2002

(30) Foreign Application Priority Data
Dec. 28, 2000 (JP) .............................. 2000-401435

(51) Int. Cl.
*H04B 10/00* (2006.01)

(52) U.S. Cl. ...................... 398/135; 398/138; 398/139; 398/136; 398/128; 398/129; 398/124; 398/121; 398/115; 398/118; 398/116; 398/117; 398/130; 398/131; 398/163; 398/164; 385/88; 385/89; 385/92; 385/93; 385/49

(58) Field of Classification Search ................ 398/115, 398/116, 117, 118, 121, 135, 136, 138, 139, 398/163, 164, 124, 128, 129, 130, 131; 385/49, 385/92, 88, 89, 93
See application file for complete search history.

(56) References Cited

U.S. PATENT DOCUMENTS 6,213,651 B1 * 4/2001 Jiang et al. .................... 385/92

6,243,508 B1 * 6/2001 Jewell et al. .................. 385/14

FOREIGN PATENT DOCUMENTS

JP 07-294777 11/1995

(Continued)

OTHER PUBLICATIONS

Kunimasa Saitoh et al., "An Anisotropic PML for Scalar FE-BPM", Digest C-3-140 of 2000 Electronics Society Conference Held By The Electronic Information and Communication Society, p. 266.

(Continued)

*Primary Examiner*—Hanh Phan
(74) *Attorney, Agent, or Firm*—Young & Thompson

(57) ABSTRACT

An optical transceiver having a transmitter section and a receiver section formed on a substrate to be close to each other is provided, which suppresses the electrical and optical crosstalk between the transmitter section and the receiver section. The transceiver comprises: (a) a substrate; (b) a transmitter section formed on the substrate and including a light-emitting element; (c) a receiver section formed on the substrate to be close to the transmitter section and including a light-receiving element; (d) a conductive first connection member fixed near the substrate; and (e) a transparent second connection member fixed near the first member in such a way as to block the first opening and the second opening of the first member from a front of the first member. The first member has a first opening that allows a first light beam to penetrate the first member and a second opening that allows a second light beam to penetrate the first member. The first opening is aligned to an optical axis of the light-emitting element. The second opening is aligned to an optical axis of the light-receiving element.

18 Claims, 3 Drawing Sheets

FOREIGN PATENT DOCUMENTS

| | | |
|---|---|---|
| JP | 09-243867 | 9/1997 |
| JP | 10-126002 | 5/1998 |
| JP | 10-225995 | 8/1998 |
| JP | 11-174269 | 7/1999 |

OTHER PUBLICATIONS

Hajime Mori et al., "C-3-140 MT-RJ Optical Transceiver Module in a Plastic Package for SM Fibers", Digest C-3-140 of 2000 General Conference, Electronic Information and Communication Society, p. 320.

* cited by examiner

OPTICAL TRANSCEIVER

BACKGROUND OF THE INVENTION

1. Field of the Invention

The present invention relates to an optical transceiver. more particularly, the invention relates to an optical transceiver having a transmitter section and a receiver section formed on a substrate to be close to each other, which suppresses the electrical and optical crosstalk between the transmitter section and the receiver section.

2. Description of the Related Art

FIG. 1 schematically shows the configuration of a prior-art optical transceiver of this type.

As shown in FIG. 1, the transceiver comprises a substrate 105, a transmitter section and a receiver section mounted on the surface of the substrate 105, and a ferrule 114 fixed at the front end of the substrate 105.

A semiconductor light-emitting element 101 (e.g., laser diode) for the transmitter section and a semiconductor light-receiving element 102 (e.g., photodiode) for the receiver section are mounted on the surface of the substrate 105. A metallic shielding plate 107 is fixed on the surface of the substrate 105 between the transmitter and receiver sections, thereby separating these two sections from each other. The plate 107 is perpendicular to the surface of the substrate 105.

At the front end of the substrate 105, the ferrule 114 is fixed for optical coupling of the transceiver with optical fibers. The ferrule 114 is formed by a synthetic resin processed precisely. Two optical fiber pieces 115 for optical interconnection are buried in the ferrule 114 to extend in parallel to each other from the front end of the ferrule 114 to the rear end thereof. The ferrule 114 is positioned with respect to the elements 101 and 102 on the substrate 105 with high accuracy. Thus, the light-emitting element 101 and the light-receiving element 102 on the substrate 104 are precisely positioned with respect to the corresponding fiber pieces 115 in the ferrule 114.

The ferrule 114 has two positioning protrusions 114a formed on its front end face to protrude forward.

When the prior-art transceiver of FIG. 1 is used, this transceiver is connected to an optical connector 110 supporting two optical fibers 111 by way of the ferrule 114. The connector 110 has two engaging holes 110a at its rear end face. The protrusions 114a of the ferrule 114 are opposed to these holes 110a. When the connector 110 is coupled with the transceiver, the protrusions 114a are inserted into and engaged with the corresponding holes 110a, resulting in the connector 110 and the ferrule 114 being coupled each other. Thus, accurate positioning between the ferrule 114 (i.e., the fiber pieces 115) and the connector 110 (i.e., the fibers 111) can be realized automatically.

The reference numerals 123 and 124 denote a transmitting LSI (Large-Scale Integrated circuit device) and a receiving LSI mounted on the surface of the substrate 105, respectively. The semiconductor light-emitting element 101 and the transmitting LSI 123 constitute the transmitter section. The semiconductor light-receiving element 102 and the receiving LSI 124 constitute the receiver section. The reference numeral 126 denotes wiring lines for electrical signals formed on the surface of the substrate 105.

With the prior-art optical transceiver shown in FIG. 1, it is one of the important requirements for improving the reception sensitivity to suppress the electrical and optical crosstalk between the transmitter and receiver sections on the substrate 105 without degrading the optical coupling efficiency of the fibers 111 with the light-emitting and light-receiving elements 101 and 102. To meet this requirement, the shielding plate 107 made of metal (e.g., Cu or Fe) is fixed on the surface of the substrate 105 between the transmitter and receiver sections.

Thus, electromagnetic waves generated in the transmitter section are prevented from affecting directly the receiver section. At the same time as this, stray light generated from the light emitted by the light-emitting element 101 is prevented from reaching the receiver section. The stray light is typically generated by the fact that small part of the light from the element 101 does not enter the corresponding optical fiber 111 by way of the corresponding optical fiber piece 115 and reflected in the vicinity of the element 101 and piece 115.

Moreover, the ferrule 114 is usually made of synthetic resin having a light-shielding property, where the resin contains an additive (e.g., a black pigment) with a light-absorbing property. The fiber pieces 115 buried in the ferrule 114 are used to block stray light traveling in the light-emission direction of the element 101. The rear end face of the ferrule 114 is formed in such a way that the light does not enter the inside of the ferrule 114 except for the rear ends of the fiber pieces 115.

An optical transceiver of this type, which comprises a transmitter section and a receiver section mounted on a substrate, is disclosed in, for example, the digest C-3-140 of the 2000 electronics society conference held by the Electronic Information and Communication Society.

However, the above-described prior-art optical transceiver with reference to FIG. 1 has the following problems.

Specifically, with the prior-art transceiver of FIG. 1, the ferrule 114 having the buried optical fiber pieces 115 is made of a synthetic resin and therefore, the front ends of the transmitter and receiver sections are covered with the resin-made ferrule 114. Thus, an electromagnetic wave propagating route 116 is formed near the front ends of these two sections, as shown in FIG. 1. This means that the effect of the electromagnetic wave that propagates along the route 116 from the transmitter section to the receiver section is unable to be blocked.

The material of the ferrule 114 can be changed from the resin to a metal having an effect of shielding the electromagnetic wave without changing the configuration of the prior-art transceiver of FIG. 1. In this case, however, another problem will occur. That is to say, the two penetrating holes for burying the fiber pieces 115 need to be formed in the metallic ferrule 114 at a specific interval in such a way as to be slightly larger than the diameter of the pieces 115 to be buried therein with extreme precision. However, such a precise hole-formation processing to a metal piece is very difficult to be realized. Furthermore, the obtainable productivity for this hole-formation processing will be low and thus, it will not be acceptable.

Moreover, the ferrule 114 may be formed by a synthetic resin having a property of absorbing electromagnetic waves. In this case also, however, another problem will occur. Generally, in substances having a property of absorbing electromagnetic waves, the effect of absorbing electromagnetic waves tends to deteriorate as the frequency of the electromagnetic wave is raised, if the frequency of the electromagnetic wave is several gigahertz (GHz) or higher. Therefore, if the transceiver operates at a high speed of 10 gigabits per second (Gb/sec) or greater, the obtainable effect of shielding electromagnetic waves will be low.

Needless to say, a metallic member may be additionally provided between the ferrule 114 and the substrate 105. In this case, however, there arises the need to place a gap for inserting the metallic member between the read ends of the fiber pieces 115 in the ferrule 114 and the light-emitting and light-receiving elements 101 and 102 on the substrate 105. This means that the optical coupling loss of the element 101 with the corresponding fiber piece 115 will increase.

SUMMARY OF THE INVENTION

Accordingly, an object of the present invention is to provide an optical transceiver having a transmitter section and a receiver section formed on a substrate to be close to each other, which suppresses effectively the electrical and optical crosstalk between the transmitter section and the receiver section.

Another object of the present invention is to provide an optical transceiver having a transmitter section and a receiver section formed on a substrate to be close to each other, in which electromagnetic wave and light generated in the transmitter section are effectively prevented from affecting the receiver section.

Still another object of the present invention is to provide an optical transceiver having a transmitter section and a receiver section formed on a substrate to be close to each other, which is easily fabricated at high mass-productivity.

The above objects together with others not specifically mentioned will become clear to those skilled in the art from the following description.

An optical transceiver according to the invention comprises:

(a) a substrate;
(b) a transmitter section formed on the substrate;
  the transmitter section including a light-emitting element;
(c) a receiver section formed on the substrate to be close to the transmitter section;
  the receiver section including a light-receiving element;
(d) a conductive first connection member fixed near the substrate;
  the first connection member having a first opening that allows a first light beam from the light-emitting element to penetrate the first member;
  the first opening being aligned to an optical axis of the light-emitting element;
  the first connection member having a second opening that allows a second light beam toward the light-receiving element to penetrate the first member;
  the second opening being aligned to an optical axis of the light-receiving element; and
(e) a transparent second connection member fixed near the first connection member in such a way as to shut the first opening and the second opening of the first connection member at a front of the first connection member;
  the first light beam from the light-emitting element propagating through the first opening and the second connection member;
  the second light beam toward the light-receiving element propagating through the second connection member and the second opening.

With the optical transceiver according to the invention, the conductive first connection member that allows the first and second light beams to respectively penetrate the same through the first and second openings is fixed near the substrate. Therefore, the electromagnetic wave emitted from the light-emitting element in the transmitter section and the extrinsic electromagnetic noise are prevented from affecting the receiver section.

In other words, the electromagnetic wave propagating route formed near the front ends of the transmitter and receiver sections can be shielded by the conductive first connection member. Thus, electrical crosstalk between the transmitter and receiver sections is suppressed and at the same time, the electric potential fluctuation induced by the electromagnetic noise is suppressed.

Moreover, the conductive first connection member has the first and second openings that allow the first and second light beams to penetrate the same, respectively. Therefore, the amount of stray light entering the receiver section is decreased. This means that optical crosstalk between the transmitter and receiver sections is suppressed.

Furthermore, optical fibers supported by an optical connector are optically coupled to the transceiver of the invention by way of the transparent second connection member. The first and second light beams are transmitted through the first and second openings of the first connection member, and the second connection member itself, between the transmitter and receiver sections and the optical fibers of the connector. Thus, there is no need to incorporate optical fiber pieces into the first connection member, which is unlike the prior-art transceiver shown in FIG. 1.

Accordingly, the accuracy or precision for the diameter and pitch of the first and second openings of the first connection member is not so strict as the ferrule used in the prior-art transceiver of FIG. 1. As a result, the conductive first connection member can be easily produced and the obtainable mass-productivity is raised or improved.

As seen from the explanation presented here, in the invention, even if the conductive first connection member is made of metal, the previously-described disadvantage of the prior-art transceiver of FIG. 1 that the obtainable productivity for the hole-formation processing is low can be compensated or eliminated.

In a preferred embodiment of the transceiver according to the invention, the second connection member is formed by a thin plastic or glass plate.

In another preferred embodiment of the transceiver according to the invention, the second connection member has a lens function for at least one of the first and second light beams. Preferably, the second connection member includes a first lens located near the first opening of the first connection member and a second lens located near the second opening of the first connection member.

In still another preferred embodiment of the transceiver according to the invention, the first connection member has a recess on its front face. The second connection member is placed in the recess.

In a further preferred embodiment of the transceiver according to the invention, a connection structure for connecting optical fibers supported by an optical connector to the transceiver is additionally formed on the first connection member. The connection structure is designed in such a way that opposing ends of the fibers are contacted with the transparent second connection member.

Preferably, the conductive first connection member is entirely made of metal. However, the first connection member may be formed by a dielectric member and a metal film that covers a surface of the dielectric member.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
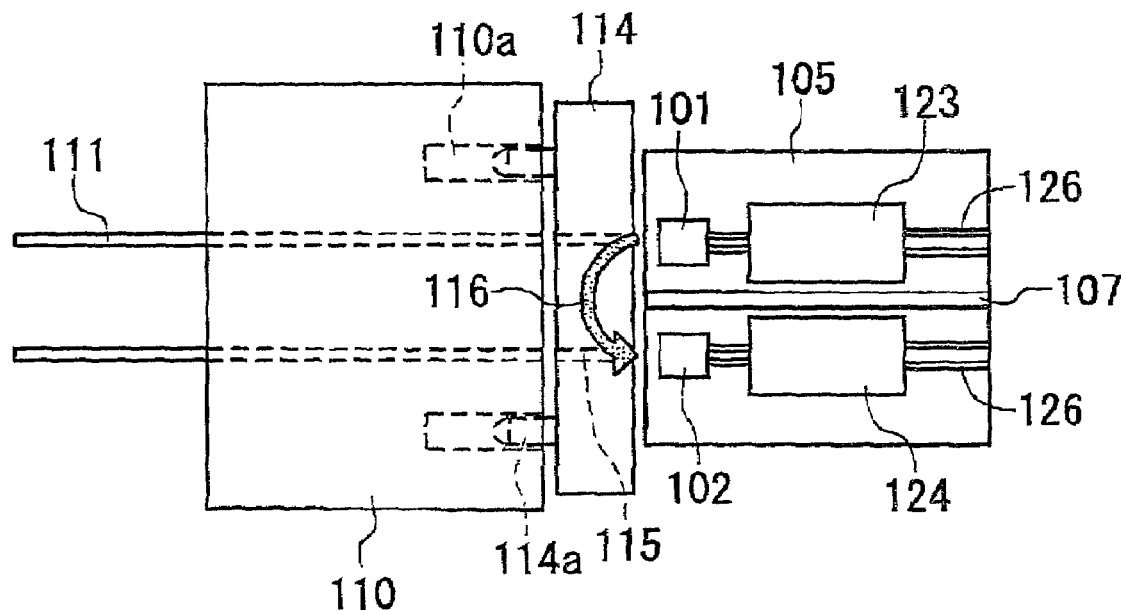
FIG. 1 is a schematic plan view showing the configuration of a prior-art optical transceiver having a transmitter section and a receiver section formed on a substrate to be close to each other.

Preferred embodiments of the present invention will be described in detail below while referring to the drawings attached.

First Embodiment

Figure 2:
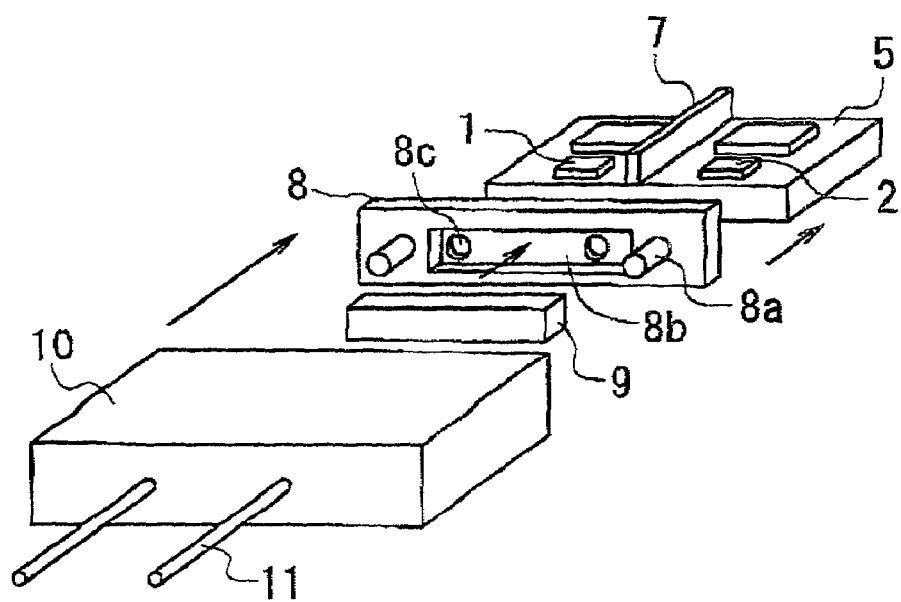
FIG. 2 is a schematic, exploded perspective view showing the configuration of an optical transceiver having a transmitter section and a receiver section formed on a substrate to be close to each other according to a first embodiment of the invention.

An optical transceiver according to a first embodiment of the invention is shown in FIGS. 1 and 2.

As shown in FIGS. 1 and 2, the transceiver of the first embodiment comprises a rectangular substrate 5, a transmitter section formed on the surface of the substrate 5, and a receiver section formed on the surface of the substrate 5 to be close to the transmitter section. Signal lines 6, power supply lines (not shown), and ground lines (not shown) are formed on the surface of the substrate 5. The signal lines 6 are used for transferring electrical signals to be sent to or from the transmitter section and for transferring electrical signals to be sent to or from the receiver section. The power supply lines are used for supplying a specific power supply voltage to the transmitter and receiver sections. The ground lines are used for electrically grounding the transmitter and receiver sections.

The transmitter section includes a light-emitting element 1 (e.g., a laser diode) and a transmitting LSI 3, both of which are mounted on the surface of the substrate 5 and electrically connected to each other by way of the corresponding signal lines 6. The receiver section includes a light-receiving element 2 (e.g., a photodiode) and a receiving LSI 4, both of which are mounted on the surface of the substrate 5 and electrically connected to each other by way of the corresponding signal lines 6. The elements 1 and 2 are located near the front end of the substrate 5.

A rectangular, metallic shielding plate 7 is fixed on the surface of the substrate 5 to be perpendicular thereto. The plate 7 extends along the longitudinal axis of the plate 5 between its front and rear ends in such a way as to separate the transmitter and receiver sections from each other.

The plate 7 has the same function of shielding the electromagnetic wave as that of the shielding plate 107 in the prior-art transceiver of FIG. 1.

A plate-shaped, metallic member 8, which is a "main connection member", is located to be close to the front end of the substrate 5. The main connection member 8 has two protrusions 8a, a rectangular recess 8b, and two pin-hole-shaped openings 8c, as clearly shown in FIG. 2. The recess 8b is positioned at the center of the flat front face of the member 8. The recess 8b is used to receive a transparent member 9 serving as an "auxiliary connection member" explained later. The front face of the member 8 is placed on the opposite side to the substrate 5. The protrusions 8a, which are outside the recess 8b, are formed on the front face of the member 8 in such a way as to be stuck forward out of the member 8. The two pin-hole-shaped openings 8c are located in the recess 8b at the positions through which two signal light beams penetrate. The member 8 is electrically grounded by way of a grounding member (not shown).

The transparent, auxiliary connection member 9, which is bar-or plate shaped and made of an optically transparent material such as glass or plastic, is fittingly inserted into the recess 8b of the metallic member 8. The auxiliary member 9 thus inserted is fixed to the main member 8 with an adhesive, or by plating the rear surface of the member 9 with a metallic film and then, soldering the metallic film thus plated with the member 8 Thus, the auxiliary member 9 is united with the main member 8 in the recess 8b.

Figure 3:
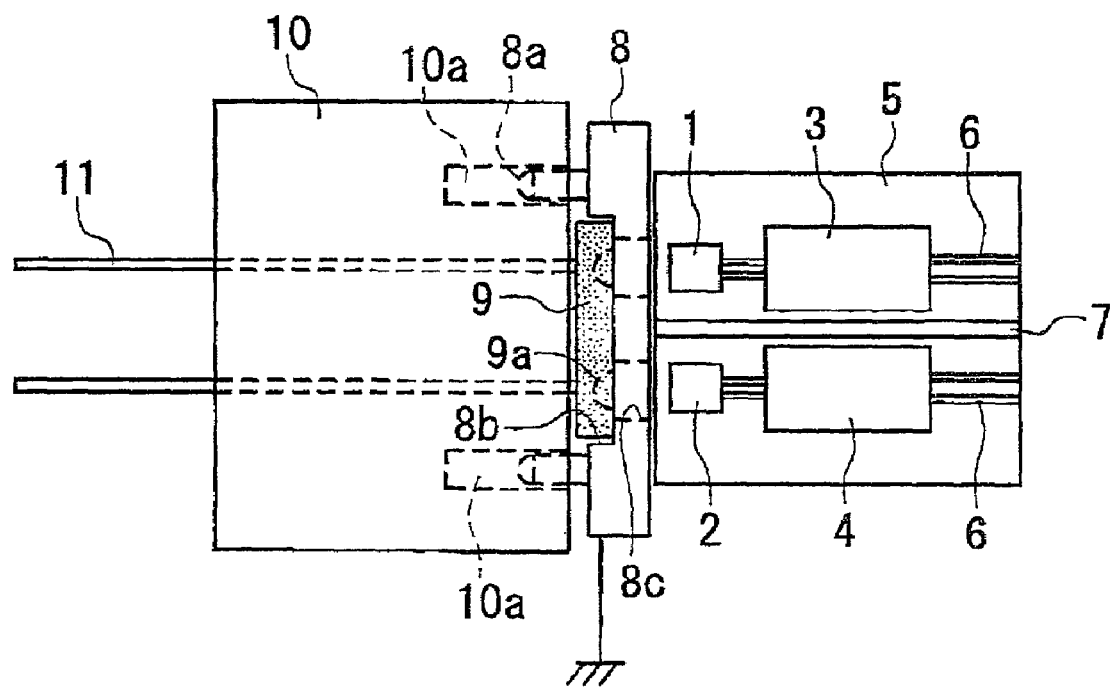
FIG. 3 is a schematic plan view showing the configuration of the optical transceiver according to the first embodiment of FIG. 2.

The thickness of the member 9 is greater than the depth of the recess 8b of the member 8. Therefore, part of the member 9 protrudes from the front face of the member 8, as shown in FIG. 3.

The transparent member 9 has two lenses 9a formed therein at the positions through which the two signal light beams penetrate. The lenses 9a are located close to the front ends of the corresponding openings 8c of the member 8. The lenses 9a are convex or of the distributed-index type (i.e., the refractive index is distributed in a specific manner). In this embodiment, one of the lenses 9a has a focal point or length defined in such a way that the light beam emitted from the light-emitting element 1 converges on the end face of an optical fiber 11 supported by an optical connector 10 explained later. The focal point or length of the other lens 9a is defined in the same way as above for the light-receiving element 2 and another optical fiber 11.

The lenses 9a of the auxiliary connection member 9 can be formed by, for example, applying a known photolithography method and a known ion-exchange method to a glass plate.

The lenses 9a are formed on only the rear end of the member 9 in this embodiment. However, the lenses 9a may be formed on the rear and front ends of the member 9 according to the necessity. If only one of the lenses 9a is sufficient, one of the lenses 9a may be cancelled.

When the transceiver of the first embodiment is used, the optical connector 10 supporting the two optical fibers 11 is attached to the flat front ends of the connection members 8 and 9. The connector 10 is made of a synthetic resin having a light-shielding property, where the resin contains a proper additive (e.g., a black pigment) with a light-absorbing property. The connector 10 is formed by molding the resin to unite with the fibers 11.

The two fibers 11 are supported by the connector 10 in parallel at a specific pitch equal to the pitch of the openings 8c of the member 8 and that of the lenses 9a of the member 9. The opposing ends of the fibers 11 to the members 8 and 9 protrude backward by a specific length (e.g., approximately 10 μm) from the rear end face of the connector 10, as shown in FIG. 3. This is to make a direct contact of the rear ends of the fibers 11 with the front face of the member 9 when the connector 10 with the fibers 11 is connected to the transceiver of the first embodiment.

The connector 10 has two engaging holes 10a for engaging the corresponding protrusions 8a of the metallic member 8, where the holes 10a are slightly larger in diameter than the protrusions 8a. If the protrusions 8a are inserted into the corresponding holes 10a and engaged therewith, the protruding rear ends of the fibers 11 are contacted with the front end face of the transparent member 9. The fibers 11 serve as transmission paths for the signal light beams.

Next, the operation of the optical transceiver according to the first embodiment is explained in detail below.

Generally, an electrical signal generated by photoelectrical conversion of a receiving photodiode as the light-receiving element 2 is a very faint signal as weak as several tens microamperes ($\mu$A). Unlike this, a comparatively large electrical current of approximately 20 mA flows through the light-emitting element 1 (i.e., a semiconductor laser diode) at its average light output. The electromagnetic waves emitted or radiated by the emitting element 1 propagate through the space in front of the element 1 and affect the receiver section including the receiving element 2, thereby causing electrical crosstalk that disorders the waveform of the received electrical signal.

As another disturbance noise, an electromagnetic noise with a strong electric-field intensity is emitted from the electrical communication apparatus and/or other equipment. If this noise is radiated to the optical connector 10 or an optical transmission module, there arises a possibility that the received electrical signal is unable to be read out due to malfunction.

In the optical transceiver of the first embodiment, the electromagnetic wave generated by pulse-driving the transmitter section including the light-emitting element 1 and that propagates to the receiver section is effectively shielded by the plate-shaped conductive member 8. The member 8 is made of metal such as Cu or Fe and has a small thickness of approximately 0.3 mm. Therefore, electrical crosstalk between the transmitter and receiver sections can be effectively suppressed by the member 8.

The diameter of the pin-hole-shaped openings 8c of the metallic member 8 is set to be approximately equal to the diameter (e.g., approximately 200 to 300 $\mu$m) of the signal light beam. Therefore, the electromagnetic noise propagated through the openings 8c can be effectively suppressed to an ignorable level. Moreover, since the member 8 is electrically connected to the ground by way of a proper grounding member (not shown), the electrical potential or level of the member 8 is kept stable. This enhances the effect of the openings 8c to suppress the electromagnetic noise.

Generally, a small part of the light emitted from the light-emitting element 1 does not enter the optical fibers 11, resulting in "stray light". The stray light thus formed tends to reach the receiver section including the element 2 and to affect the same. However, in the optical transceiver of the first embodiment, the stray light can be effectively shielded or blocked by the pin-hole-shaped opening 8c of the member 8 for the receiver section. As a result, the optical crosstalk can be effectively suppressed as well.

Furthermore, the rear ends of the two optical fibers 11 supported by the connector 10 protrude backward from the rear end of the connector 10 by a very short length (e.g., approximately 10 $\mu$m). Therefore, when the connector 10 is attached to the transceiver of the first embodiment, the rear ends of the fibers 11 contact the front face of the transparent member 9, as shown in FIG. 3. Thus, the Fresnel reflection occurring at the rear ends of the fibers 11 can be suppressed. In other words, the reflected light generated at the rear ends of the fibers 11 is prevented from returning to the light-emitting element 1. This means that disturbance of the modulation characteristic of the element 1 is suppressed effectively.

The positioning or engaging protrusions 8a of the metallic member 8 are provided on its front face in such a way as to be engaged with the corresponding openings 10a of the connector 10. Thus, the fibers 11 of the connector 10 are automatically aligned to the optical axes of the lenses 9a of the transparent member 9 and those of the openings 8c of the member 8. To form the protrusions 8a, the required processing accuracy is in the order of one micrometer ($\mu$m). However, this is easily realized if a proper electroforming process is used. This means that the protrusions 8a can be easily formed with desired high accuracy even if the member 8 is made of metal.

The connector 10 and the metallic member 8 (with the transparent member 9) are pressed to each other with a spring (not shown) provided in the housing (not shown) for the transceiver. Thus, the connector 10 and the member 8 (with the member 9) are fixed to their desired positions.

When the lenses 9a of the member 9 are aligned to the corresponding protrusions 8a of the member 8, proper position-recognizing marks (not shown) are preferably formed on the protrusions 8a and the lenses 9a. If so, the lenses 9a can be easily aligned to the corresponding protrusions 8a by a proper image-recognition method. Needless to say, the lenses 9a themselves may be used for this purpose instead of the marks.

The positioning between the metallic member 8 and the substrate 5 is usually carried out by monitoring the light beam emitted from the light-emitting element 1 on the substrate 5. If proper protrusions (or openings) are formed on the rear face of the member 8 and at the same time, proper openings (or protrusions) are formed on the front end of the substrate 5, the member 8 and the substrate 5 can be positioned easily and accurately by engaging the protrusions with the openings.

With the optical transceiver according to the first embodiment of FIGS. 2 and 3, the conductive, plate-shaped metallic member (i.e., the main connection member) 8 having the pin-hole-shaped openings 8c that allow the light beams to penetrate the same is placed near the front end of the substrate 5. Therefore, the electromagnetic wave, which is emitted from the element 1 to propagate through the space in front of the element 1, and the extrinsic electromagnetic noise can be shielded. As a result, the electrical crosstalk between the transmitter and receiver sections can be suppressed effectively.

Moreover, the stray light is blocked by the openings 8c of the metallic member 8 and thus, it does not enter the receiver section. Therefore, optical crosstalk between the transmitter and receiver sections can be suppressed effectively as well.

It is sufficient that the openings 8c of the metallic member 8 are formed in such a way as not to block the signal light beams. This means that the accuracy or precision for the diameter and pitch of the openings 8c is not so strict as the ferrule 114 used in the prior-art transceiver. As a result, the member 8 can be easily produced and the obtainable mass-productivity is raised or improved, even if the member 6 is made of metal.

Since the transparent member (i.e., the auxiliary connection member) 9 has the lenses 9a, the optical coupling efficiency of the transceiver and the optical fibers 11 is improved to a satisfactory level.

The protruding rear ends of the optical fibers 11 are directly contacted with the flat front face of the member 9 and thus, Fresnel reflection at the ends of the fibers 11 is suppressed. This means that the optical noise caused by the reflected light at the ends of the fibers 11 can be suppressed. Multiple reflections in the transmission paths of the signal light beams can be suppressed as well.

Second Embodiment

Figure 4:
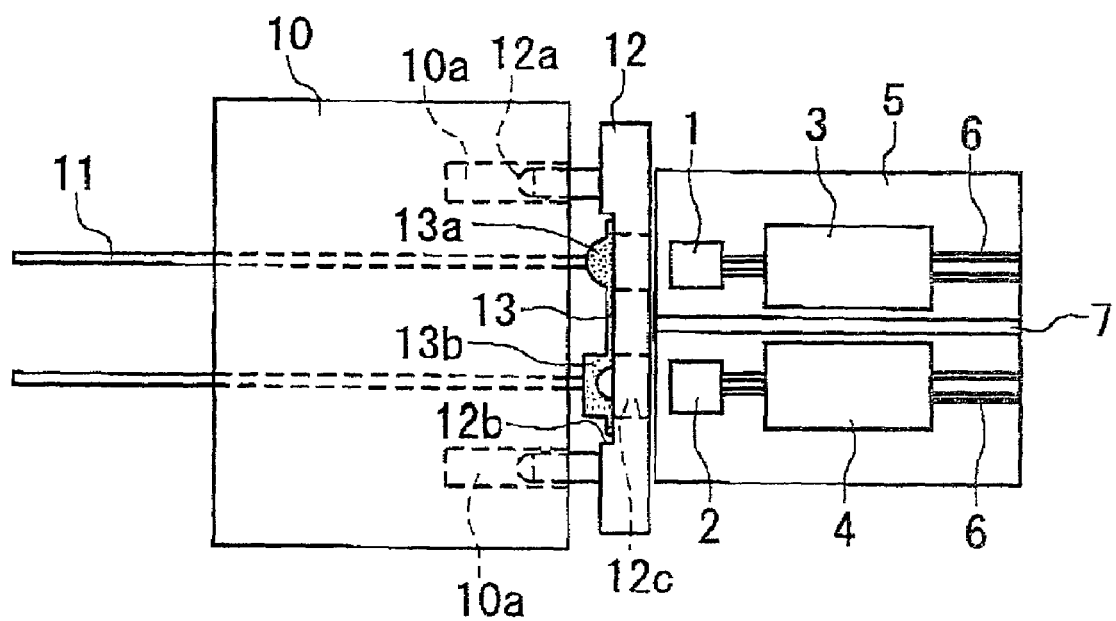
FIG. 4 is a schematic plan view showing the configuration of an optical transceiver having a transmitter section and a receiver section formed on a substrate to be close to each other according to a second embodiment of the invention.
Figure 5:
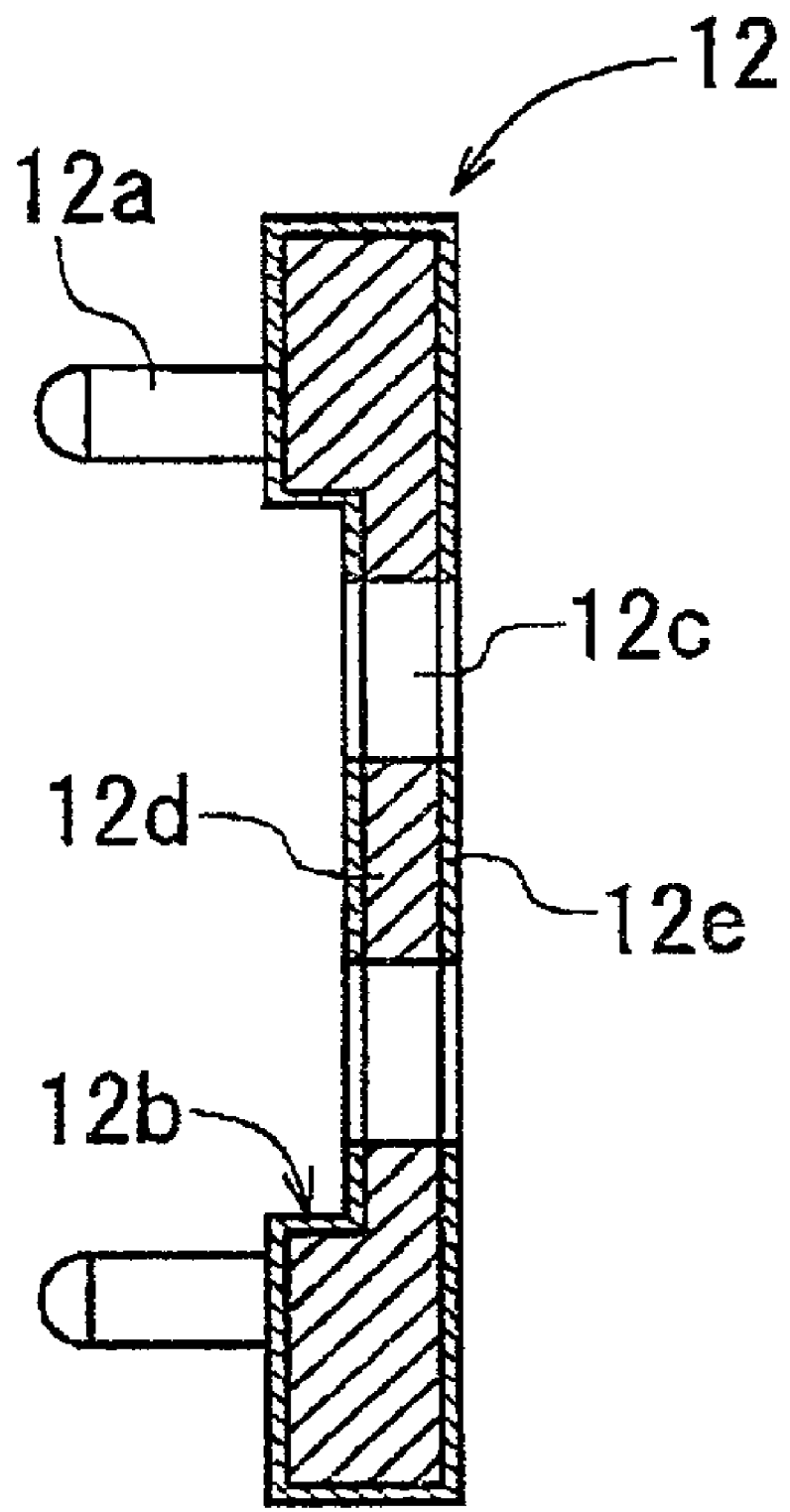
FIG. 5 is a schematic cross-sectional view showing the configuration of the glass plate covered with the metal film used as the plate-shaped glass member in the transceiver according to the second embodiment of FIG. 4.

FIGS. 4 and 5 show the configuration of an optical transceiver according to a second embodiment of the invention. This transceiver has the same configuration as the transceiver of the first embodiment of FIGS. 1 and 2, except that a plate-shaped metal-covered glass member 12 is used instead of the plate-shaped metallic member 8, and that a micro-lens pair 13 with a convex micro-lens 13a and a concave micro-lens 13b is used instead of the plate-shaped transparent member 9.

As shown in FIG. 5, the plate-shaped transparent glass member 12 is formed by a glass plate 12d to which a light-absorbing additive is added, and a plated metal film 12e covering the whole surface of the plate 12d. On the flat front face of the member 12, a rectangular recess 12b is formed in such a way as to receive the micro-lens pair 13. The recess 12b is substantially the same as the recess 8b of the member 8 in the first embodiment. The micro-lens pair 13 is fittingly inserted into the recess 12b and fixed thereto.

Two pin-hole-shaped holes 12c of the member 12 are formed to penetrate the same at the corresponding positions to the optical axes of the light-emitting and light-receiving members 1 and 2, respectively. The holes 12c are substantially the same as the holes 8c in the first embodiment.

Two protrusions 12a of the member 12 are formed to protrude forward from its front face, which is the same as the protrusions 8a of the member 8 in the first embodiment.

The convex micro-lens 13a of the micro-lens pair 13 is aligned to the optical axis of the light-emitting element 1 and the axis of the corresponding opening 12c. The concave micro-lens 13b of the pair 13 is aligned to the optical axis of the light-receiving element 2 and the axis of the corresponding opening 12c.

The micro-lens pair 13 may be made of a transparent glass or resin by using a proper molding method, for example.

With the optical transceiver according to the second embodiment of FIGS. 4 and 5 also, by setting the thickness of the metal film 12e of the member 12 at a specific value or greater, the member 12 represents the same function as the member 8 in the first embodiment, even if the member 12 includes the glass plate 12d. Therefore, the electrical and optical crosstalk can be suppressed effectively like the first embodiment.

Moreover, because of the same reason as shown in the first embodiment, there are the remaining same advantages of the first embodiment.

Instead of the member 12 made of the glass plate 12d and the covering metal film 12e, a ceramic or resin plate covered with a metal film may be used.

In the second embodiment, the convex micro-lens 13a of the pair 13 is applied to the light-emitting element 1 while the concave micro-lens 13b of the pair 13 is applied to the light-receiving element 2. Therefore, there is an additional advantage that the optically coupling loss for transmitting and receiving light beams can be minimized.

Variations

Needless to say, the present invention is not limited to the above-described first and second embodiments. Any change or modification may be added to these embodiments within the spirit of the invention.

For example, the light-emitting and light-receiving elements 1 and 2 are optically connected to the respective optical fibers 11 by way of the lenses 9a in the first embodiment or the micro-lenses 13a and 13b in the second embodiment. Instead of this, a thin, transparent glass or plastic plate with a thickness of approximately 100 μm that has no lens function may be used. In this case, the rear ends of the fibers 11 are contacted with the flat front face of this plate. Thus, the light-emitting element 1 is optically connected to the corresponding fiber 11 with a butt joint by way of the glass or plastic plate. If a laser diode is used as the element 1, the optically coupling loss will be approximately 10 dB. However, there is an additional advantage that the fabrication cost can be lowered.

Furthermore, in the above-described first and second embodiments, the invention is applied to the case where the signal light beam is applied to or emitted from the element 1 or 2 in a direction parallel to the surface of the substrate 5. However, the invention is applicable to the case where the signal light beam is applied to or emitted from the element 1 or 2 in a direction perpendicular to the substrate 5. The direction of the signal light beam may be set any angle other than 0° or 90° with respect to the surface of the substrate 5.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An optical transceiver comprising:
    (a) a substrate;
    (b) a transmitter section formed on the substrate;
        the transmitter section including a light-emitting element;
    (c) a receiver section formed on the substrate to be close to the transmitter section;
        the receiver section including a light-receiving element;
    (d) a conductive first connection member fixed near the substrate;
        the first connection member having a first opening that allows a first light beam from the light-emitting element to penetrate the first connection member;
        the first opening being aligned to an optical axis of the light-emitting element;
        the first connection member having a second opening that allows a second light beam toward the light-receiving element to penetrate the first connection member;
        the second opening being aligned to an optical axis of the light-receiving element; and
    (e) a transparent second connection member fixed near the first member in such a way as to shut the first opening and the second opening of the first connection member at a front of the first connection member;
        the first light beam from the light-emitting element propagating through the first opening and the second connection member;
        the second light beam toward the light-receiving element propagating through the second connection member and the second opening.

2. The transceiver according to claim 1, wherein the second connection member is formed by a thin plate of plastic or glass.

3. The transceiver according to claim 1, wherein the second connection member has a lens function for at least one of the first and second light beams.

4. The transceiver according to claim 1, wherein the second connection member is formed by a thin plate of plastic or glass;
and wherein the second connection member includes a first lens near the first opening of the first connection member and a second lens near the second opening thereof.

5. The transceiver according to claim 4, wherein each of the first and second lenses is a convex lens.

6. The transceiver according to claim 5, wherein the first lens has a focal length defined in such a way that the first light beam emitted from the light-emitting element converges on an opposing end face of an optical fiber to be optically connected to the transceiver.

7. The transceiver according to claim 4, wherein the first lens is a convex lens and the second lens is a concave lens.

8. The transceiver according to claim 7, wherein the first lens has a focal length defined in such a way that the first light beam emitted from the light-emitting element converges on an opposing end face of an optical fiber to be optically connected to the transceiver.

9. The transceiver according to claim 1, wherein the first connection member has a recess formed on its front face;
and wherein the second connection member is located in the recess.

10. The transceiver according to claim 9, wherein the first connection member has a thickness greater than a depth of the recess, thereby part of the first connection member protrudes from the recess.

11. The transceiver according to claim 9, further comprising a connection structure for connecting optical fibers supported by an optical connector to the transceiver formed on the first connection member;
wherein the connection structure is designed in such a way that opposing ends of the fibers are contacted with the transparent second connection member.

12. The transceiver according to claim 11, wherein the opposing ends of the fibers protrude backward from a rear face of the connector by a specific length.

13. The transceiver according to claim 1, wherein the first connection member is made of metal.

14. The transceiver according to claim 1, wherein the first connection member is made of a dielectric core and a metal film that covers a whole surface of the core.

15. The transceiver according to claim 1, wherein the first connection member is electrically connected to the ground.

16. The transceiver according to claim 1, further comprising a metallic shielding member located on the surface of the substrate between the transmitter section and the receiver section;
wherein the metallic shielding member separates the transmitter section and the receiver section from each other.

17. The transceiver according to claim 1, wherein the first connection member has a recess formed on its front face;
and wherein the second connection member is fixed to the first connection member in the recess;
and wherein the second connection member includes a first lens near the first opening of the first connection member and a second lens near the second opening thereof.

18. The transceiver according to claim 1, wherein the first and second light beams are approximately parallel to the surface of the substrate;
and wherein the first connection member is fixed near an end of the substrate.

* * * * *